United States Patent [19]
Arai et al.

[11] 3,816,258
[45] June 11, 1974

[54] PROCESS FOR PRODUCING L-HISTIDINE BY FERMENTATION

[75] Inventors: Yukou Arai; Fumio Kato, both of Shizuoka-ken, Japan

[73] Assignee: Kyowa Hakko Kogyo Kabushiki Kaisha, Tokyo-to, Japan

[22] Filed: Apr. 12, 1972

[21] Appl. No.: 243,440

[30] Foreign Application Priority Data
Apr. 14, 1971  Japan............................... 46-23044

[52] U.S. Cl..................... 195/47, 195/29, 195/112, 195/121
[51] Int. Cl............................................. C12d 1/02
[58] Field of Search.............. 195/47, 32, 42, 29, 30

[56] References Cited
UNITED STATES PATENTS

| | | | |
|---|---|---|---|
| 3,355,359 | 11/1967 | Goto et al............................ | 195/29 |
| 3,713,977 | 1/1973 | Nakayama et al................... | 195/47 |

*Primary Examiner*—A. Louis Monacell
*Assistant Examiner*—Thomas G. Wiseman
*Attorney, Agent, or Firm*—Wolder & Gross

[57] ABSTRACT

A process for producing L-histidine by fermentation using a microorganism capable of producing L-histidine, characterized in that the microorganism is cultured in a medium containing a growth-inhibiting agent.

11 Claims, No Drawings

PROCESS FOR PRODUCING L-HISTIDINE BY FERMENTATION

DETAILED DESCRIPTION OF INVENTION

The present invention relates to a process for producing L-histidine by fermentation on an industrial scale.

More particularly, the present invention relates to a process for producing L-histidine by fermentation whereby a microorganism capable of producing L-histidine is cultured in a medium containing a carbon source, a nitrogen source, inorganic salts and other nutrients, and which is characterized by a growth-inhibiting agent being present in the culture medium. It is now possible to produce and accumulate L-histidine at high concentrations and in good yields so that L-histidine may be obtained industrially and economically.

The commercial production of L-histidine is significant because of its various important uses, such as, for example, as an additive to medicaments, foodstuffs, feeds, etc.

It has now been discovered that a large amount of L-histidine may be produced and accumulated in a better yield and at a higher concentration by the addition of a growth-inhibiting agent to the culture medium when L-histidine is produced by fermentation of an L-histidine-producing microorganism. That is to say, the present invention is based upon the discovery that it is possible to produce L-histidine in better yield and at higher concentration by the addition of a growth-inhibiting agent to the culture medium so as to inhibit the growth of the microorganism used. In addition, the addition of the growth-inhibiting agent is economically advantageous because it is thereby possible to prevent contamination by other undesired microorganisms.

The use of a growth-inhibiting agent has conventionally been applied to the production of L-glutamic acid by fermentation, but it has never been reported in the art in the case of the fermentation of L-histidine. In case of L-glutamic acid fermentation, the growth-inhibiting agent should be used under the conditions of the presence of an excessive amount of biotin which is not capable of producing L-glutamic acid so as to produce L-glutamic acid. In contrast, in the case of L-histidine fermentation, the amount of L-histidine produced increases significantly by the addition of the growth-inhibiting agent under the conditions capable of producing L-histidine. This distinction is also very significant from the biochemical viewpoint.

The present invention will be more fully and clearly described in the following specification.

A seed culture of a microorganism capable of producing L-histidine is inoculated in a main culture medium containing suitable amounts of carbon source, nitrogen source, inorganic salts and, if desired, other nutrients, and is cultured under aerobic conditions at a temperature of from 25° to 35° C at a pH of from 5 to 8 for not more than 24 hours. After this, a suitable amount of a growth-inhibiting agent is added to the medium and the cultivation is additionally carried out in similar conditions to those of the prior cultivation except the culturing time of from 48 to 72 hours so that a large amount of L-histidine is produced and accumulated in the medium.

L-histidine-producing microorganisms which may be used for the purpose of the present invention are exemplified by those belonging to the genera Brevibacterium, Corynebacterium, Arthrobacter, Micrococcus, Bacillus, Nocardia and the like through any and all strains capable of producing L-histidine may be used regardless to their taxonomical classification. Such microorganisms are well known in the art for producing L-histidine.

All strains denoted in the following specification are on deposit with the American Type Culture Collection, and are freely available to the public.

Growth-inhibiting agents which may be used for the purpose of the present invention includes basically any and all substances having antibiotic properties such as antibiotics, surface-active agents as well as various organic and inorganic inhibiting agents.

Preferable antibiotics are exemplified by penicillin, streptomycin, cephalosporin, cycloserine, chloramphenicol, erythromycin, tetracyclin, bacitracin, kanamycin, spiramycin, viomycin, novobiocin, colistin, etc. Preferable surface-active agents are exemplified by anionic surface-active agents such as alkyl sulphates, alkylaryl sulphonates, alkyl phosphates, amide sulphonates, ester sulphonates and amide sulphates; cationic surface-active agents such as amines and salts thereof, quarternary ammonium salts, pyridinium salts, and picolinium salts; amphoteric surface-active agents of betaine-type, sulfuric acid ester-type and sulfonic acid-type; and non-ionic surface active agents, such as polyoxyethylene alkylether, polyoxyethylene alkylphenolether, polyoxyethylene alkylester, sorbitan alkylester, polyoxyethylene sorbitan alkylester, polyoxyethylene glycolester, and polyoxyethylene glycolether, etc.

Preferable organic and inorganic inhibiting agents are exemplified by mercuric chloride, acrinol, resorcinol, and cresol, etc.

It has been found that among these agents penicillin and nonionic surface-active agents are particularly useful for the purpose of the present invention. The term "penicillin" used in the present specification denotes penicillin G, $\alpha$-phenoxyethyl penicillin, phenoxymethyl penicillin, ampicillin, carbenicillin and various other synthetic penicillin of the known types.

The conditions under which the growth-inhibiting agent according to the present invention is applied are very important and are also very interesting from the biochemical viewpoint. In case a growth-inhibiting agent having a strong activity is used, it is advantageous that the addition is effected at a later stage of the logarithmic growth of the strain used. In particular, in the case of using an L-histidine-producing strain which has been obtained from an L-glutamic acid-producing strain by mutation treatment, as shown in the examples, addition at an earlier stage of the logarithmic growth gives rise to the production of a relatively large amount of L-glutamic acid, while addition effected at a later stage of the logarithmic growth of the used strain produces a large amount of L-histidine without the production of L-glutamic acid.

The amount of the added growth-inhibiting agent having a strong activity is advantageously from 1 to 100 $\gamma$/ml preferably 1 to 50 $\gamma$/ml of the medium. On the other hand, nonionic surface active agents, which have less inhibition effect may be added at an earlier stage of the logarithmic growth of the strain used, preferable in an amount of from 100 to 2,000 γ/ml of the medium.

The recovery of L-histidine accumulated in the culture liquor may be effected by a conventional method, for example, by means of chromatography on an ion exchange resin.

The following Table 1 shows the experimental results obtained according to the present invention with and without the addition of the growth-inhibiting agent, penicillin G potassium salt. The technical advance of the present invention is clearly shown.

TABLE 1

| Penicillin G Potassium salt Time of Addition Hour(s) | Amount of Addition γ/ml | Dry Cell Weight mg/ml | L-histidine mg/ml | Amount of L-histidine produced mg/mg cell |
|---|---|---|---|---|
| 15 | 5 | 40.9 | 7.14 | 0.175 |
| 18 | 10 | 37.4 | 10.62 | 0.284 |
| No addition | | 50.1 | 5.70 | 0.114 |

Note to Table 1:
Strain: An L-histidine-producing strain of Corynebacterium glutamicum deposited with FERM 900 (ATCC 21604). The seed culture was formed as described in Example 1 below.
Composition of medium: Sucrose (20 percent), $KH_2PO_4$ (0.2 percent), $K_2HPO_4$ (0.1 percent), $MgSO_4 \cdot 7H_2O$ (0.05 percent), $FeSO_4 \cdot 7H_2O$ (0.001 percent), $MnSO_4 \cdot 4H_2O$ (0.001 percent), corn steep liquor (0.5 percent), biotin (200 γ/1), $(NH_4)_2SO_4$ (2.0 percent) and urea (0.2 percent)

Main culture:
The main culture was carried out in a similar manner to that described in Example 2 below.

As apparent from the results shown above, the formation and accumulation of L-histidine significantly increased by the addition of a growth-inhibiting agent to the culture liquor.

The following non-limitative examples further illustrate the invention.

EXAMPLE 1

I. Strain : An L-histidine-producing strain of Corynebacterium glutamicum which is deposited with FERM 900 (ATCC 21604).

II. Seed culture: 20 ml of a medium consisting of glucose (4 percent), peptone (2 percent), beef extract (1 percent), yeast extract (0.5 percent), $MgSO_4 \cdot 7H_2O$ (0.05 percent), $KH_2PO_4$ (0.15 percent), $K_2HPO_4$ (0.05 percent), biotin (30 γ/1) and urea (0.3 percent) and having an adjusted pH of 7.2 was put into a 250 ml Erlenmeyer flask and sterilized by heating. The strain was inoculated to the medium and culture for 24 hours at 28° C with shaking.

III. Main culture: 40 ml of a medium consisting of sucrose (20 percent), $KH_2PO_4$ (0.2 percent), $K_2HPO_4$ (0.1 percent), $MgSO_4 \cdot 7H_2O$ (0.05 percent), $FeSO_4 \cdot 7H_2O$ (0.001 percent), $MnSO_4 \cdot 4H_2O$ (0.001 percent), corn steep liquor (0.5 percent), biotin (200 γ/1), $(NH_4)_2SO_4$ (2 percent) and urea (0.2 percent) and having an adjusted pH of 7.2 was put into a Sakaguchi flask and sterilized by heating, to which 2 ml of the seed culture was inoculated. After culturing for 24 hours at 28° C with shaking, various fractions of antibiotics and organic and inorganic inhitors in various concentrations which had been separately prepared under sterile conditions were respectively added to the fractions of culture liquor, as shown in Table 2. Each fraction was additionally cultured for 48 hours with shaking.

The amounts of L-histidine accumulated in the respective culture liquor when using different inhibitors are shown in Table 2.

TABLE 2

| Additives | | Amt. of addition (γ/ml) | Dry cell weight (mg/ml) | L-histidine (mg/ml) |
|---|---|---|---|---|
| Anti biotics | Penicillin G Potassium salt | 2.5 | 17.4 | 6.94 |
| | " | 5 | 16.3 | 7.08 |
| | " | 10 | 15.2 | 7.98 |
| | Cycloserine | 10 | 18.7 | 7.01 |
| | | 20 | 15.9 | 6.82 |
| | Cephalosporin | 10 | 16.8 | 7.11 |
| | | 20 | 15.7 | 6.63 |
| | Streptomycin | 5 | 16.2 | 5.38 |
| | | 10 | 15.1 | 5.55 |
| Inorganic inhibitor | Mercuric chloride | 2 | 14.0 | 4.90 |
| Organic inhibitor | Acrinol | 2 | 14.2 | 5.00 |
| No addition | | | 21.1 | 4.55 |

EXAMPLE 2

I. Strain: A similar strain to that described in Example 1 was used.

II. Seed Culture: 300 ml of a similar medium to that described in Example 1 was put into a 2-liter conical flask and sterilized by heating. The strain was inoculated to the medium and cultured for 24 hours at 28° C with shaking.

III. Main culture: 3 liters of a similar medium to that described in Example 1 was put into a 5-liter jar fermenter and sterilized by heating. 300 ml of the seed culture was inoculated and cultured at 28° C at pH 6.8 with agitation of 650 r.p.m. and aeration. After this, 10 γ/ml of penicillin G potassium salt which has been separately prepared under sterilie conditions were added respectively to the fractions of the main culture at various stage of the culturing as shown in Table 3. Each fraction was then additionally cultured for 48–72 hours under similar conditions to those described above with agitation and aeration.

The amounts of L-histidine and L-glutamic acid thus accumulated in the respective culture liquor are shown in Table 3.

TABLE 3

| Addition of Penicillin G potassium salt | | Dry cell weight | L-histidine | L-glutamic acid |
|---|---|---|---|---|
| Time of addition (hr) | Amount of addition (γ/ml) | (mg/ml) | (mg/ml) | (mg/ml) |
| 9 | 10 | 20.2 | 4.6 | 27.5 |
| 15 | 10 | 24.3 | 6.2 | 23.2 |
| 20 | 10 | 42.1 | 9.3 | 0.5 |
| No addition | | 52.2 | 6.0 | 0 |

EXAMPLE 3

A similar treatment to that described in Example 1 was carried out except that Brevibacterium flavum FERM 901 (ATCC 21605) was used as the seed and various surface active agents as shown in Table 4 were respectively added to the fractions of culture medium for inhibition purpose.

The amounts of L-histidine thus produced in these fractions are shown in Table 4.

TABLE 4

| Surface active agents* | | Amt. of addition (γ/ml) | Dry cell weight (mg/ml) | L-histidine (mg/ml) |
|---|---|---|---|---|
| | Nimine S-215 | 100 | 13.4 | 5.2 |
| Cationic | Cation M₂-100 | 100 | 11.9 | 5.7 |
| | Cation AB | 100 | 12.1 | 5.1 |
| Anionic | Diapon T | 10 | 10.5 | 5.0 |
| Ampholic | Anon BF | 100 | 11.5 | 5.3 |
| Nonionic | OP-85-R | 1000 | 21.0 | 7.1 |
| No addition | | | 22.1 | 4.1 |

Note to Table 4:
* manufactured by Nippon Yushi Kabushiki Kaisha
Nimine S-215: polyoxyethylene alkylamine
Cation M₂-100: Alkyl dimethyl benzyl ammonium chloride
Cation AB: alkyl trimethyl ammonium halide
Diapon T: Oleic acid amide sulfonic acid salt
Anon BF: Alkyl betaine
OP- 85-R: sorbitan trioleate

EXAMPLE 4

A similar treatment to that described in Example 1 was carried out with the exception of the use of various L-histidine-producing strains listed in Table 5 as well as of the addition of 10 γ/ml of penicillin G potassium salt.

The amounts of L-histidine thus accumulated are shown in Table 5.

TABLE 5

| Used strain | L-histidine mg/ml with addition of penicillin | L-histidine mg/ml without addition of penicillin |
|---|---|---|
| Corynebacterium glutamicum FERM 902 (ATCC 21607) | 7.13 | 4.60 |
| Brevibacterium flavum FERM 901 (ATCC 21605) | 6.61 | 4.51 |
| Arthrobacter citreus FERM 898 (ATCC 21600) | 2.41 | 1.53 |
| Bacillus megaterium FERM 899 (ATCC 21603) | 3.20 | 2.05 |

As shown in he above examples, the addition of growth-inhibiting agents substantially improves the yield of L-histidine.

Various modifications of the present invention will suggest themselves to those skilled in the art.

Having described the present invention, that which is sought to be protected is set forth in the claims.

What is claimed is:

1. In a process for producing L-histidine by fermentation using a microorganism capable of producing L-histidine, said microorganism being selected from the group consisting of Genera Brevibacterium, Corynebacterium, Arthrobacter, Bacillus, Micrococcus and Nocardia, in which the microorganism is cultured in a medium containing carbon sources, nitrogen sources and inorganic salts, the improvement which comprises adding an effective amount of a growth-inhibiting agent during the logarithmic growth phase so as to increase L-histidine yield.

2. The improvement of claim 1 in which said microorganism is selected from the group consisting of genera Brevibacterium flavum, Cornynebacterium glutamicum, Arthrobacter Bacillus and BAcillus megaterium.

3. The improvement of claim 2 in which said microorganism is selected from the group consisting of Brevibacterium flavum ATCC 21605, Corynebacterium glutanicum ATCC 21604 and ATCC 21607, Arthrobacter citreus ATCC 21600 and Bacillus megaterium ATCC 21603.

4. The improvement of claim 1 in which the cultivation is carried out under aerobic conditions at a temperature of from 25° to 35° C at a pH of from 5 to 8 for 48–96 hours.

5. The improvement of claim 1 in which the growth-inhibiting agent is present in the medium in an amount of not more than 2,000 γ/ml.

6. The improvement of claim 5 in which the growth-inhibiting agent is added to the medium within 24 hours from the beginning of the cultivation.

7. The improvement of claim 5 in which the growth-inhibiting agent is selected from the group consisting of antibiotics, surface-active agents, organic and inorganic inhibiting agents.

8. The improvement of claim 7 in which the growth-inhibiting agent is an antiobiotic selected from the group consisting of penicillin, streptomycin, cephalosporin, cycloserine, chloramphenicol, erythromycin, tetracyclin, bacitracin, kanamycin, spiramycin, viomycin, novobiocin and colistin.

9. The improvement of claim 7 in which the growth-inhibiting agent is a surface-active agent selected from the group consisting of alkyl sulphates, alkylaryl sulphonates, alkyl phosphates, amide sulphonates, ester sulphonates, amide sulphates, amines and salts thereof, quartenary ammonium salts, pyridinium salts, picolinium salts, amphoteric surface active agents of betaine-type, sulfuric acid ester-type and sulfonic acid-type, polyoxyethylene alkylether, polyoxyethylene alkylphenolether, polyoxyethylene alkylester, sorbitan alkylester, polyoxyethylene sorbitan alkylester, polyoxyethylene glycolester, and polyoxyethylene glycolether.

10. The improvement of claim 7 in which the growth-inhibiting agent is an organic or inorganic agent selected from the group consisting of mercuric chloride, arcinol, resorcinol and cresol.

11. A process for producing L-histidine by fermentation using a microorganism selected from the group consisting of Brevibacterium flavum ATCC 21605, Corynebacterium glutamicum ATCC 21604 and ATCC 21607, Arthrobacter citreus ATCC 21600 and Bacillus megaterium ATCC 21603, in which said microorganism is cultured in a medium containing carbon sources, nitrogen sources and inorganic salts under aerobic conditions at a temperature of from 25° to 35° C at a pH of from 5 to 8 for 48–96 hours, the improvement which comprises adding to the medium a growth-inhibiting agent in a amount of up to 2,000 γ/ml of the medium within 24 hours from the beginning of the cultivation, said agent being selected from the group consisting of penicillin, streptomycin, cephalosporin, cycloserine, chloramphenicol, erythromycin, tetracyclin, bacitracin, kanamycin, spiramycin, viomycin, novobiocin, colistin, alkyl sulphates, alkylaryl sulphonates, alkyl phosphates, amide sulphates, amines and salts thereof, quarternary ammonium salts, pyridinium salts, picolinium salts, amphoteric surface active agents of betaine-type, sulfuric acid ester-type, and sulfonic acid-type, polyoxyethylene alkylether, polyoxyethylene alkylphenolether, polyoxyethylene alkylester, sorbitan alkylester, polyoxyethylene sorbitan alkylester, polyoxyethylene glycolester, polyoxyethylene glycolether, mercuric chloride, acrinol, resorcinol and cresol so as to increase L-histidine yield.

* * * * *